United States Patent
Dolganow et al.

(10) Patent No.: US 8,289,864 B2
(45) Date of Patent: Oct. 16, 2012

(54) DPI-TRIGGERED APPLICATION-AWARE DORMANCY TIMER ADJUSTMENT FOR MOBILE DATA BEARERS

(75) Inventors: Andrew Dolganow, Kanata (CA); Steven Edward Morin, Ottawa (CA)

(73) Assignee: Alcatel Lucent, Paris (FR)

( * ) Notice: Subject to any disclaimer, the term of this patent is extended or adjusted under 35 U.S.C. 154(b) by 753 days.

(21) Appl. No.: 12/200,772

(22) Filed: Aug. 28, 2008

(65) Prior Publication Data

US 2010/0054231 A1 Mar. 4, 2010

(51) Int. Cl.
*H04L 12/26* (2006.01)

(52) U.S. Cl. ........ 370/252; 370/329; 370/341; 370/389; 370/401; 370/437; 455/450; 455/451; 455/452.1; 455/452.2

(58) Field of Classification Search .................. 370/328, 370/329, 341, 389, 400, 401, 437; 455/450, 455/451, 452.1, 452.2
See application file for complete search history.

(56) References Cited

U.S. PATENT DOCUMENTS

| | | | |
|---|---|---|---|
| 7,139,246 B2 * | 11/2006 | Harris et al. | 370/252 |
| 7,289,480 B2 | 10/2007 | Lundstrom et al. | |
| 7,436,779 B1 * | 10/2008 | Mangal et al. | 370/252 |
| 2002/0172178 A1 * | 11/2002 | Suzuki et al. | 370/338 |
| 2003/0235171 A1 * | 12/2003 | Lundstrom et al. | 370/338 |
| 2010/0062781 A1 * | 3/2010 | Dolganow et al. | 455/450 |

* cited by examiner

*Primary Examiner* — Christopher Grey
(74) *Attorney, Agent, or Firm* — Kramer & Amado, PC (57) ABSTRACT

Based on application information received from a Deep Packet Inspection (DPI) device, a Radio Network Controller (RNC) or similar device may select a dormancy timer value to optimize the use of network resources. In particular, the RNC may set an additional dormancy timer based on a default value or a rough determination of the application by examining port numbers. After the DPI device has received a sufficient number of packets to identify the underlying application, the DPI device may then propagate the application information to the RNC. Based on this application information, the RNC may determine the most efficient dormancy timer and modify the value of the default timer based on this determination.

20 Claims, 5 Drawing Sheets

DPI-TRIGGERED APPLICATION-AWARE DORMANCY TIMER ADJUSTMENT FOR MOBILE DATA BEARERS

BACKGROUND OF THE INVENTION

1. Field of the Invention

This invention relates generally to management of bandwidth in a mobile network.

2. Description of Related Art

Wireless devices such as mobile phones and email devices have dramatically changed the way people communicate with one another. With the emergence of compact devices that allow a user to make telephone calls, browse the Internet, watch video, and check email, it is easier than ever for people to exchange information. As the ease of communication for end users has increased, however, the burdens placed on the underlying network infrastructure have also increased. In particular, mobile networks must now provide not only voice services, but also data services.

The designers of mobile networks continuously alter mobile networks for the use of wireless devices as the devices evolve to support large amounts of packet data transfer with different application characteristics. Unfortunately, because the voice network handles both phone calls and packet data transfer using the same architecture and resource-reservation protocols, service providers have been forced to compromise service for some applications. In particular, service providers have added data services onto existing voice networks by selecting a small number of data applications for which a guaranteed Quality of Service (QoS) is provided, while providing only best effort service to the remaining applications.

In current mobile networks, upon receipt of a call request, a radio network controller (RNC) or analogous device performs connection admission control (CAC) that guarantees bandwidth resources in the wireless portion of the network. Accordingly, when a user places a call, the network guarantees the user sufficient bandwidth to complete the call without interruption. This scheme simplifies billing for the service provider, as the service provider can simply charge the user based on the total duration of the call.

Similarly, when the network receives a request for a packet data session, the radio network controller reserves a channel for the data transfer. Problems arise with this approach, as consumers expect to be billed based on the amount of data transferred, rather than the connection time. Accordingly, regardless of the amount of time a customer utilizes a reserved channel, the service provider charges the customer based on the amount of data transferred. This creates an incentive for the service provider to minimize the duration for which a channel is reserved for transfer of packet data.

In order to achieve this goal, service providers use a value known as a "dormancy timer." Upon reservation of a channel, the device responsible for bandwidth allocation sets a dormancy timer. As the source and destination transfer packet data over the channel, the channel transitions to an active state. Upon completion of the transfer, the channel enters a dormant state and a timer begins. When this timer exceeds the value of the dormancy timer, the channel is closed and the resources are returned to the network for allocation to another user.

As should be apparent from the above description, the use of a dormancy timer attempts to minimize the allocation of resources for packet data sessions. Because the network bears additional costs when establishing a channel, however, a balance must be reached in setting the value of the dormancy timer. In particular, setting the value of the dormancy timer too low will result in frequent reestablishment of channels, thereby inefficiently consuming resources in creating channels and affecting the quality of the user experience. On the other hand, setting the value too high will result in unnecessary reservation of network channels and wasted bandwidth.

Current implementations unsuccessfully attempt to mitigate this problem. One implementation relies on the user endpoint to provide information used by the radio network controller in setting the dormancy timer. This approach has proven to be ineffective, as the user endpoint provides information regarding only the client, not the underlying application. For example, the user endpoint may identify the client as a mobile web browser, but would not identify the particular application, such as sending an email or simple web browsing. This results in significant inefficiencies, as the dormancy requirements for an email transfer and a web browsing session differ dramatically.

Another implementation attempts to address dormancy timer inefficiencies by utilizing a variable dormancy timer policy on a per-user basis. In particular, in one implementation, as a user requests resources for a particular application, a network device identifies applications associated with the flow by examining Layer 3 and Layer 4 packet headers. The network device uses the application information to modify a user-specific profile, including a dormancy timer, based on all flows associated with the user. When allocating bandwidth, the base station controller accesses the user-specific profile and the dormancy timer associated with that particular user.

This implementation fails to effectively implement application-awareness with a satisfactory degree of certainty. More specifically, this implementation assumes that applications comply with the policies set by the Internet Assigned Numbers Authority, which assigns port numbers for each application. This assumption is often erroneous, as applications often "fake" port or header information in order to avoid detection by header-based filters. For example, many peer-to-peer or instant messaging applications attempt to circumvent such filters by modifying TCP or UDP ports to emulate an application that receives preferential treatment in the network.

Accordingly, there is a need for a system and method that enable effective selection of dormancy timer values that overcomes the problems of current implementations. In particular, there is a need for a solution that propagates accurate application information to the entity responsible for bandwidth allocation, such that this entity may appropriately set and modify a dormancy timer based on the underlying application.

The problems described above are illustrative of those that are addressed by the various exemplary embodiments and are not intended to be exhaustive or limiting of the possible problems addressed or solved. Thus, other problems solved by the various exemplary embodiments will be apparent to those of ordinary skill in the art.

SUMMARY OF THE INVENTION

In light of the present need for DPI-triggered application-aware dormancy timer adjustment, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a mobile network includes a Deep Packet Inspection (DPI) device, such that packets pass through the DPI device prior to forwarding. The DPI device identifies traffic passing through the mobile network based on information extracted from the header and/or data portion of the incoming packets. Using the information extracted from the packets, the DPI device may add application information to the packet, thereby allowing downstream devices to identify the application for the packet based on header inspection only and perform application-specific processing. Alternatively, rather than adding application information to the packet, the DPI device may instead use messages to transmit application information to the downstream or upstream device.

Based on the application information received from the DPI device, the downstream or upstream device, such as a Radio Network Controller (RNC), may select a dormancy timer value to optimize the use of network resources. In particular, the RNC may set an initial dormancy timer based on a default value or a rough determination of the application by examining port numbers. After the DPI device has received a sufficient number of packets to identify the underlying application, the DPI device may then propagate the application information to the RNC. Based on this application information, the RNC may determine the most efficient dormancy timer and modify the value of the default timer accordingly.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Referring now to the drawings, in which like numerals refer to like components or steps, there are disclosed broad aspects of various exemplary embodiments.

Figure 1:
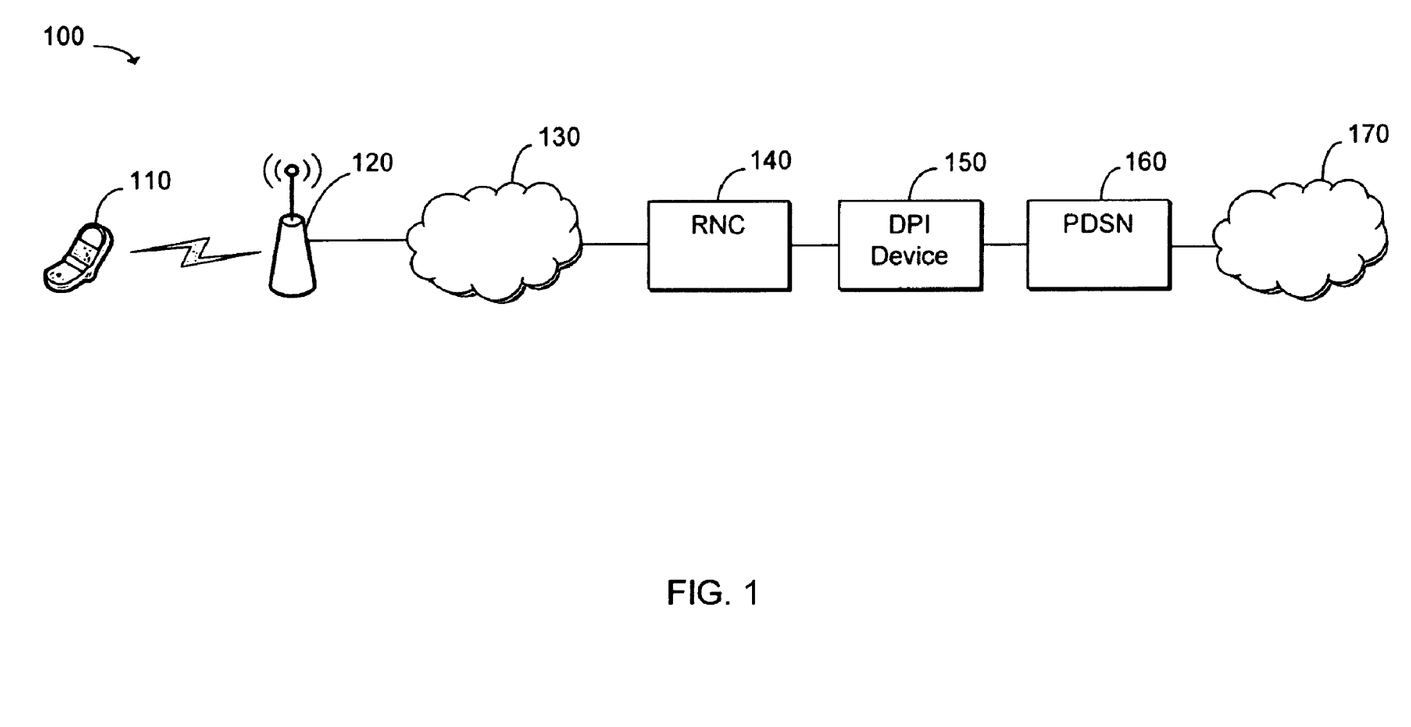
FIG. 1 is a schematic diagram of an exemplary mobile network utilizing in-line DPI to implement application-aware dormancy timer adjustment.

FIG. 1 is a schematic diagram of an exemplary mobile network 100 utilizing in-line DPI in a mobile part of the network 100. Exemplary mobile network 100 includes user node 110, wireless base station 120, network 130, radio network controller 140, DPI device 150, packet data serving node 160, and network 170.

In various exemplary embodiments, user node 110 is a device operated by a user that enables access to mobile network 100. More specifically, in various exemplary embodiments, user node 110 is a cell phone, personal digital assistant, personal or laptop computer, wireless email device, or any other device that supports wireless communications. User node 110 may generate and send data packets related to one or more applications or may receive data packets from another wireless or wireline device with connectivity to user node 110 through the mobile network 100.

In various exemplary embodiments, wireless base station 120 is a device including an antenna to wirelessly exchange data with user node 110 over a plurality of radio channels. Furthermore, wireless base station 120 includes a wire line interface to forward data into network 130. Thus, wireless base station 120 may be a Node B in a 3G network or another base transceiver station communicating in a Global System for Mobile Communications (GSM), Universal Mobile Telecommunications System (UMTS), Long Term Evolution (LTE), or other wireless network.

Additionally, in various exemplary embodiments, network 130 provides a connection between wireless base station 120 and radio network controller 140. It should be apparent that network 130 may be any network capable of sending data and requests between wireless base station 120 and radio network controller 140. Accordingly, network 130 may comprise a plurality of routers, switches, bridges, and other components suitable for receiving and forwarding data packets.

In various exemplary embodiments, radio network controller 140 controls and manages a plurality of wireless base stations 120. Thus, radio network controller 140 directs the transmission and reception of data in wireless base station 120 by controlling the radio transmitters and receivers in wireless base station 120. Additionally, radio network controller 140 may manage establishment of channels and set a dormancy timer for each channel. Radio network controller 140 may also receive and transmit packet-switched data between wireless base station 120 and packet data serving node 160.

It should be apparent a base station controller or any device capable of directing the operation of wireless base station 120 and receiving and transmitting data packets may serve as a replacement for radio network controller 140. For example, radio network controller 140 may instead be a Mobile Management Entity (MME) in an LTE network.

In various exemplary embodiments, radio network controller 140 receives application information inserted into a data packet by DPI device 150 or propagated from DPI device 150 to radio network controller 140 through other means that do not affect applications packets, such as in-band or out-of band messaging. Radio network controller 140 may then utilize the received application information to manage the selection of a dormancy timer value when modifying or establishing a channel.

The internal components of radio network controller 140 are described further below with reference to FIG. 2. Establishment of channels by radio network controller 140 is described further below with reference to FIG. 6, while the application-specific modification of dormancy timers is described further below with reference to FIG. 7.

In addition, in various exemplary embodiments, mobile network 100 includes a deep packet inspection device 150 that intercepts, "sniffs," or otherwise receives packets transmitted from user node 110 to a destination in network 170 or from a point in network 170 to user node 110. As described further below with reference to FIG. 5, DPI device 150 receives a packet, identifies characteristics of an application associated with the packet, and adds a marking or other information to the packet to allow downstream application-specific processing and forwarding.

In various exemplary embodiments, DPI device 150 comprises specialized hardware and/or software that are capable of examining data packets received from or transmitted to radio network controller 140 to identify applications associated with the packets. The internal components of DPI device 150 are described further below with reference to FIG. 3.

In various exemplary embodiments, DPI device 150 is integrated into radio network controller 140, packet data switching node 160, a network element that is part of a network (not shown) providing connectivity between radio network controller 140 and packet data switching node 160, or into a network element that is part of network 170. In various exemplary embodiments, the network providing connectivity comprises a plurality of routers, switches, bridges, and other components suitable for receiving and forwarding data packets. Alternatively, in various exemplary embodiments, DPI device 150 is integrated into wireless base station 120 or a network element that is part of network 130.

It should be apparent, that although illustrated as a standalone device, in various exemplary embodiments, DPI device 150 is a component integrated into a router. Thus, in various exemplary embodiments, DPI device 150 analyzes each packet received by the router before the router forwards the packet to the next hop. Furthermore, in various exemplary embodiments, DPI device 150 instead resides between packet switching data node 160 and network 170.

It should be apparent that DPI device 150 is illustrated as directly connected to radio network controller 140 and packet data serving node 160 for the sake of simplicity. Accordingly, in various exemplary embodiments, one or more switches, routers, bridges, or other network elements are placed between DPI device 150 and radio network controller 140 or packet data serving node 160. Alternatively, DPI device 150 may be placed off-line and obtain replicated traffic sent from or destined for user node 100 for application identification and further application-specific processing.

In various exemplary embodiments, packet data serving node 160 serves as a connection between mobile network 100 and one or more IP networks (not shown). Thus, in various exemplary embodiments, packet data serving node 160 forwards packets between the Internet and radio network controller 140. It should be apparent that packet data serving node 160 may be replaced by a Gateway General Packet Radio Service Support Node (GGSN), a Serving Gateway General Packet Radio Service Support Node (SGSN), Access Serving Gateway, Long Term Evolution (LTE) Serving Gateway or PDN Gateway, or any other node capable of providing a connection between mobile network 100 and an IP network.

In various exemplary embodiments, network 170 receives data from and transmits data to packet data serving node 160. Thus, in various exemplary embodiments, network 170 comprises a plurality of routers, switches, bridges, user nodes and other components suitable for sending, receiving, and forwarding data packets.

It should be apparent that, although illustrated as a 3G wireless network, network 100 may be a different type network. Thus, in various exemplary embodiments, network 100 is a cellular network operating under a different standard, a satellite network, or some other type of network in which application-specific modification of dormancy timers is desired.

Figure 2:
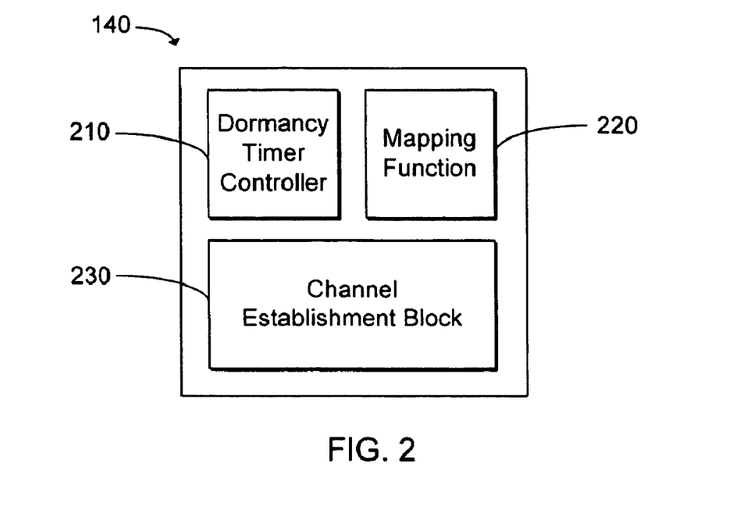
FIG. 2 is a schematic diagram of an exemplary radio network controller for use in the system of FIG. 1.

FIG. 2 is a schematic diagram of an exemplary radio network controller 140 for use in system 100 of FIG. 1. The following description of the components of radio network controller 140 is intended to introduce the functionality of each component. A more detailed explanation of channel establishment and dormancy timer modification will be provided below with reference to FIGS. 6 and 7, respectively.

In various exemplary embodiments, radio network controller 140 includes dormancy timer controller 210, mapping function 220, and channel establishment block 230. Dormancy timer controller 210, mapping function 220, and channel establishment block 230 may comprise hardware, software, or a combination thereof that executes the functionality required for dormancy timer selection and/or channel establishment. Thus, each component 210, 220, 230 may be a set of instructions encoded on a computer-readable storage medium and configured for execution by a processor. Alternatively, each component 210, 220, 230 may comprise a processor, Field Programmable Gate Array (FPGA), or any other hardware mechanism that may be pre-configured to execute a set of instructions.

In various exemplary embodiments, dormancy timer controller 210 receives application information inserted into a data packet by DPI device 150 or propagated directly from DPI device 150. Dormancy timer controller 210 may then process the received application information to manage the selection of a dormancy timer value when modifying a channel. In particular, dormancy timer controller 210 may select the dormancy timer value by accessing mapping unction 220 using the application information received from DPI device 150.

Additionally, dormancy timer controller 210 may rely on a simple mechanism to quickly determine the initial value of the dormancy timer. For example, dormancy timer controller 210 may inspect any L2-L4 protocol headers, such as Transmission Control Protocol (TCP), User Datagram Protocol (UDP), or Real-Time Transport Protocol (RTP) port numbers to make a rough determination of the application associated with the flow. Dormancy timer controller 210 may make this determination, for example, by accessing information provided by the Internet Assigned Numbers Authority. Alternatively, dormancy timer controller 210 may select a fixed dormancy timer value specified by the service provider. As described further herein, after DPI device 150 receives enough packets to identify the application associated with the flow, dormancy timer controller 210 may refine the value of the dormancy timer.

In various exemplary embodiments, mapping function 220 provides functionality used to select a dormancy timer based on the application associated with a flow. Thus, mapping function 220 may store a table or other data structure that provides a correspondence between applications and dormancy timers. For example, mapping function 220 may indicate that email applications or streaming video should be set to have a dormancy timer with a low value, while web browsing sessions should be configured with a high value. Furthermore, the service provider may determine that modification of dormancy timers is unnecessary for some applications. Thus, for these applications, mapping function 220 may include a blank dormancy timer field or no entry for the application at all.

In various exemplary embodiments, channel establishment block 230 establishes and modifies radio channels. Thus; channel establishment block 230 may receive a data packet, determine whether a new channel is required, and then reserve bandwidth in the mobile network for transmission of packets belonging to the flow. When establishing a new channel, channel establishment block 230 may query dormancy timer controller 210 to determine the proper dormancy time value. As described above, dormancy timer controller 210 may determine this value based on a rough determination of the application using port numbers or by selecting a default value.

Channel establishment block 230 may also implement the functionality required to modify the dormancy timer value for a channel that has already been established. Thus, when DPI processor 150 has received enough packets to identify the application associated with the flow, channel establishment block 230 may modify the dormancy timer value based on the updated timer value determined by dormancy timer controller 210.

It should be apparent that, although described above as distinct components, dormancy timer controller 210, mapping function 220, and channel establishment block 230 may be merged into fewer modules. Alternatively, the functions performed by one or more of the components 210, 220, 230 may be separated into multiple components, such that radio network controller 140 includes additional components. Alternative arrangements of the functionality of radio network controller 140 will be apparent to those of ordinary skill in the art.

Furthermore, RNC 140 may include other components known to those of skill in the art. For example, RNC 140 may include a receiving module configured to receive packets, messages, and other information from user node 110, DPI device 150, or any other component in network 100. RNC 140 may also include a transmitting module configured to send packets, messages, and other information to user node 110, DPI device 150, or any other component in network 100.

Figure 3:
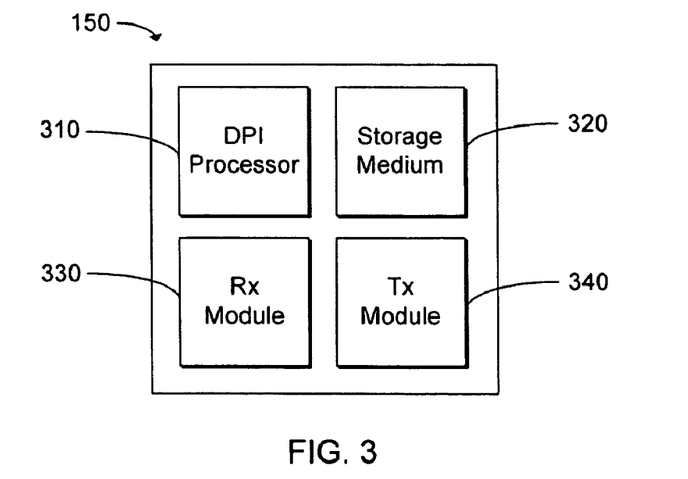
FIG. 3 is a schematic diagram of an exemplary deep packet inspection device for use in the system of FIG. 1.

FIG. 3 is a schematic diagram of an exemplary deep packet inspection device 150 for use in system 100 of FIG. 1. In various exemplary embodiments, DPI device includes a DPI processor 310, a computer-readable storage medium 320, a receiving module 330, and a transmitting module 340.

In various exemplary embodiments, DPI processor 310 is a microprocessor or executable software encoded on a computer-readable medium. DPI processor 310 is configured to examine any combination of information in layers 2 through 7 of the Open Systems Interconnection (OSI) model. Thus, in various exemplary embodiments, DPI processor 310 performs a "deep" analysis of one or more packets in order to identify an application associated with the packets. For example, DPI processor 310 may analyze packets in a flow to determine whether the flow relates to email, streaming video, web browsing, peer-to-peer transfer, VoIP, teleconferencing, or any other application of interest to the service provider. In various exemplary embodiments, the analysis performed by DPI processor 310 includes at least one of signature and pattern matching, stateful monitoring, behavioral analysis, and statistical analysis.

In various exemplary embodiments, DPI device 150 includes a computer-readable storage medium 320, such as flash memory, Random Access Memory (RAM), a hard drive, or another suitable storage medium known by those of skill in the art. Storage medium 320 may temporarily store packets prior to forwarding and store information used to identify the application associated with a flow. For example, because several packets are often necessary to accurately identify an application, storage medium 320 may temporarily store previously forwarded packets for each flow.

In addition, DPI device 150 may include a receiving module 330 and a transmitting module 340, which may be a combination of hardware and software. Receiving module 330 may be configured to receive packets from RNC 140 and PDSN 160. Transmitting module 340 may be configured to transmit packets to RNC 140 and PDSN 160. It should be apparent, however, that both modules may be configured to communicate with any device in network 100.

Figure 4:
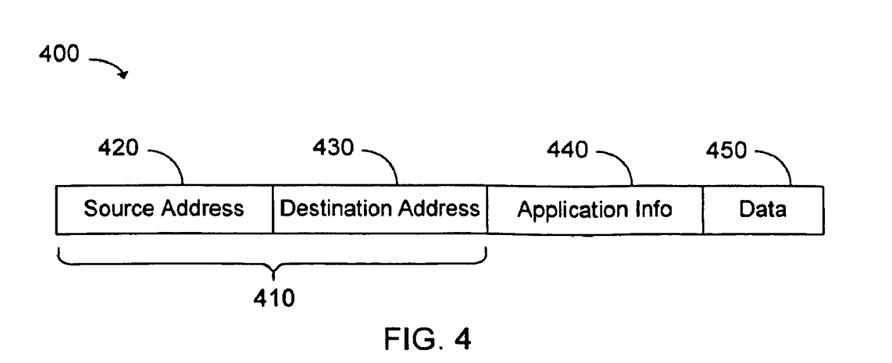
FIG. 4 is a schematic diagram of an exemplary layer 3 packet including one or more fields for storing application information.

FIG. 4 is a schematic diagram of an exemplary L3 packet 400 including one or more fields for storing application information. Packet 400 may be used to forward application information from DPI processor 150 to RNC 140, such that RNC 140 may set the dormancy timer based on the contents of packet 400. In various exemplary embodiments, L3 packet 400 includes, among other fields, packet header 410, source address 420, destination address 430, application information 440, and payload 450.

In various exemplary embodiments, packet header 410 includes data used to forward packet 400 from a source to a destination. Thus, in various exemplary embodiments, packet header 410 includes a source address 420, which may include a source IP address and a source port. Furthermore, in various exemplary embodiments, packet header 410 includes destination address 430, which may include a destination IP address and a destination port.

Furthermore, packet 400 includes application information 440, which, in various exemplary embodiments, identifies an application associated with packet 400 on its own or through correlation with other packets belonging to the application. In various exemplary embodiments, application information 440 is placed into an IP header extension, which may be an additional header inserted between packet header 410 and payload 450 of packet 400. Thus, in various exemplary embodiments, application information 440 consists of one or more type length values (TLV) indicating a name, alphanumeric identifier, or other information identifying an application associated with packet 400. It should be apparent that, instead of an alphanumeric value, any information suitable for identifying the application and associated characteristics may be placed in application information 440.

Furthermore, it should be apparent that packet header 410 is shown as including only source address field 420 and destination address 430 for the sake of simplicity. Thus, in various exemplary embodiments, packet header 410 includes additional fields including, but not limited to, a protocol number, traffic class, flow label, payload length, next header, and hop limit. Furthermore, it should be apparent that packet 400 may be an IP packet, Transmission Control Protocol (TCP) packet, User Datagram Protocol (UDP) packet, GRE packet, a packet formatted according to a proprietary protocol, or a packet formatted in any other protocol that may be modified to include application information.

Figure 5:
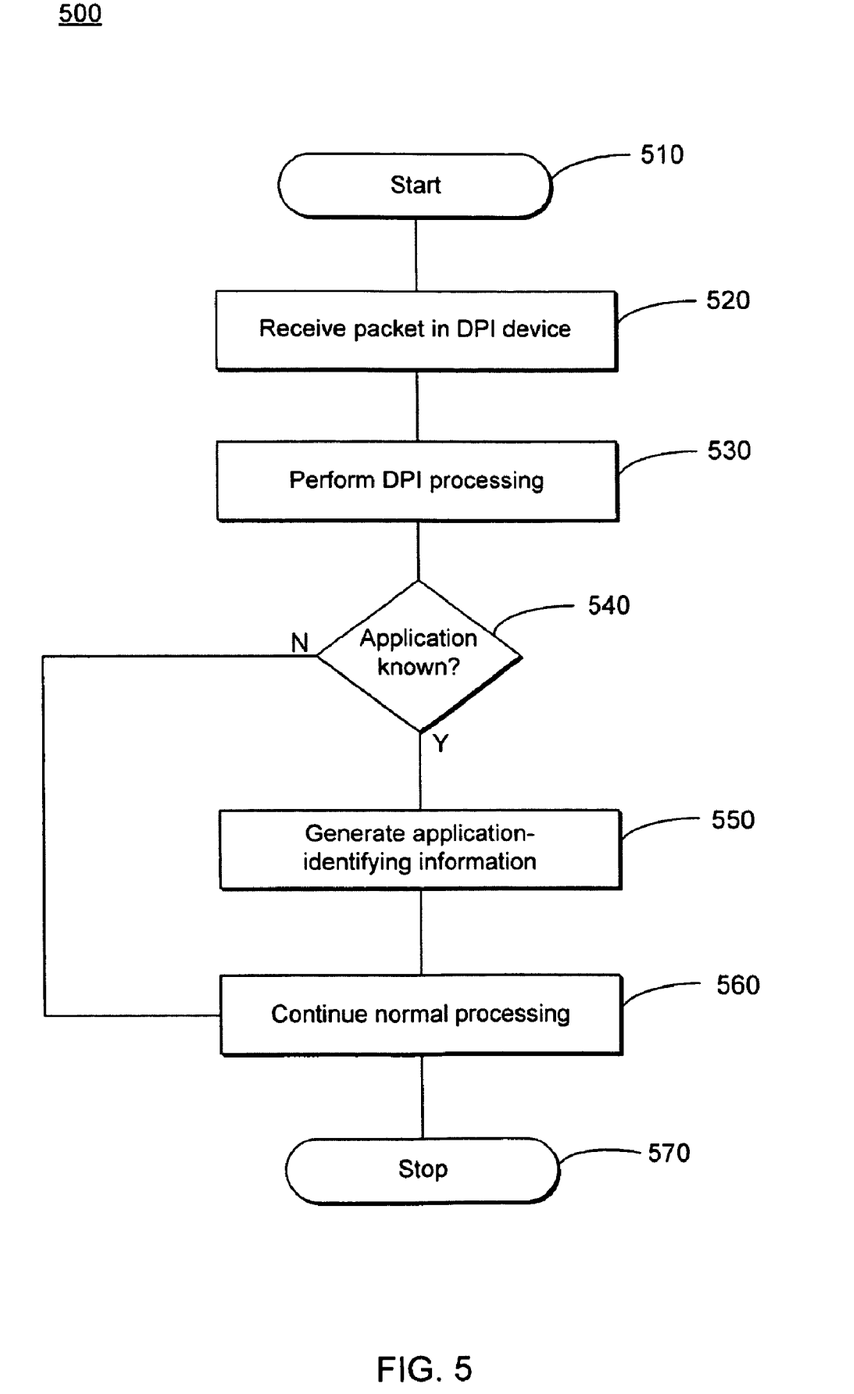
FIG. 5 is a flow chart of an exemplary embodiment of a method for using a deep packet inspection device to forward application information to a downstream device.

FIG. 5 is a flow chart of an exemplary embodiment of a method 500 for using DPI device 150 to forward application information to a downstream device. Exemplary method starts in step 510 and proceeds to step 520, where DPI device 150 intercepts, sniffs, or otherwise receives a packet transmitted from a source node to a destination node.

Exemplary method 500 then proceeds to step 530, where DPI device 150 performs DPI processing. In particular, DPI device 150 identifies a flow associated with the packet using header information from the packet, then performs DPI processing on the identified flow. Thus, in various exemplary embodiments, DPI device 150 examines any combination of information in Open Systems Interconnection (OSI) layers 2 through 7 of one or more packets to identify an application associated with the flow. For example, DPI device 150 may analyze one or more packets belonging to identified flow or a group of flows to determine whether the flow or a group of flows relates to email, streaming video, web browsing, peer-to-peer transfer, Voice over IP (VoIP), or any other application of interest to the service provider. In various exemplary embodiments, the analysis performed by DPI device 150 includes at least one of signature and pattern matching, stateful monitoring, behavioral analysis, and statistical analysis.

After performing DPI processing in step 530, exemplary method 500 proceeds to decision step 540, where DPI device 150 determines whether the application identified in step 530 is known. Thus, DPI device 150 may, for example, access application information stored in storage medium 320 to determine whether the application is known.

When, in decision step 540, DPI device 150 determines that the application is known, exemplary method 500 proceeds to step 550, where DPI device 150 generates application-identifying information. In various exemplary embodiments, DPI device 150 associates application information with the packet. For example, DPI device 150 may add an alphanumeric value identifying the application associated with the flow. More particularly, DPI device 150 may add the identifiers to an IP header extension or a proprietary protocol extension. Alternatively, DPI device 150 may add the identifiers to at least one of a key field and a sequence number field of a GRE packet header. It should be apparent that, in various exemplary embodiments, DPI device 150 adds the application identifier to any field in the packet, provided that a downstream device may extract the application information. As described further below with reference to FIG. 7, the packet received by the downstream device may then be processed to determine application information for use in modifying a dormancy timer.

As an alternative to adding information to the packet, various exemplary embodiments generate an in-band or out-of-band message that may be sent directly from DPI device 150 to the downstream device. For example, DPI device 150 may form a message including an application identifier, such as an alphanumeric value. Those of skill in the art will appreciate that any method of message exchange may be employed to send the application information from DPI device 150 to the downstream device. As described further below with reference to FIG. 7, the message received by the downstream device may then be processed to determine application information for use in modifying a dormancy timer.

After DPI device 150 generates the application-identifying information in step 550, exemplary method 500 proceeds to step 560. Alternatively, when it is determined in decision step 540 that the application associated with the flow is unknown, method 500 skips step 550 and proceeds directly to step 560.

In step 560, DPI device 150 continues normal processing. For example, DPI device 150 may forward the packet, drop the packet, select a forwarding policy based on the identified application, gather statistics, or perform any other operation. Other typical packet processing operations performed by DPI device 150 will be apparent to those of ordinary skill in the art. Exemplary method 500 then proceeds to step 570, where exemplary method 500 stops.

Figure 6:
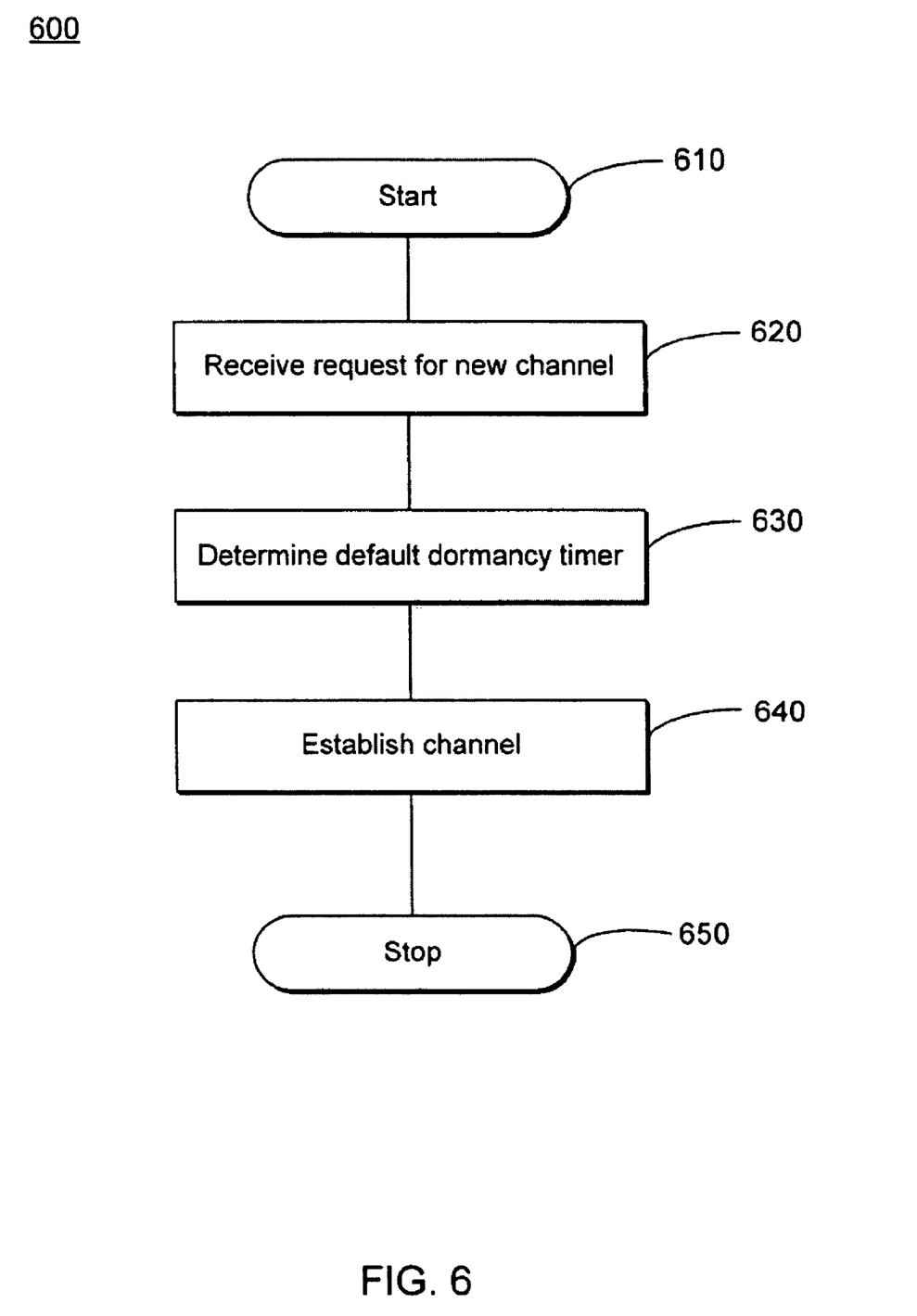
FIG. 6 is a flow chart of an exemplary embodiment of a method for establishing a channel in a mobile network.

FIG. 6 is a flow chart of an exemplary embodiment of a method 600 for establishing a channel in a mobile network. The processing steps of method 600 may be performed by RNC 140. It should be apparent, however, that any device that manages the allocation of resources in system 100 may perform method 600.

Exemplary method 600 starts in step 610 and proceeds to step 620, where RNC 140 receives a request for a new channel. In particular, user node 110 may send a signal to RNC 140 indicating that the user desires transmit and receive data packets using the radio network and that a new channel is required. Alternatively, an LTE Evolved Packet Core element may generate a channel request on data transmission received from user node 100 or destined for user node 110.

After receiving the request for a new channel in step 620, exemplary method 600 proceeds to step 630, where RNC 140 determines a default dormancy timer. In particular, dormancy timer controller 210 of RNC 140 may use a fixed dormancy timer value initially applied to all flows. This dormancy timer value could be, for example, a value specified by the service provider to be the most effective value for a typical flow.

As an alternative to a predetermined default value, dormancy timer controller 210 of RNC 140 may inspect the TCP, UDP, or RTP port numbers associated with the flow to make a rough determination of the application associated with the flow. Dormancy timer controller 210 may make this determination, for example, by accessing information provided by the Internet Assigned Numbers Authority. Dormancy timer controller 210 may then determine the dormancy timer value based on the rough determination of the application by accessing mapping function 220.

After determining a default value for the dormancy timer in step 630, exemplary method 600 proceeds to step 640, where RNC 140 establishes a channel to transmit packets to and from the requesting node 110. In particular, RNC 140 may determine whether a base station 120 has bandwidth available to handle the packet transfer requested by node 110. When a channel is available, RNC 140 may then reserve the channel using the default dormancy timer determined in step 630. Packet data may then flow to and from user node 110 over the channel established by RNC 140. Exemplary method 600 then proceeds to step 650, where exemplary method 600 stops.

Figure 7:
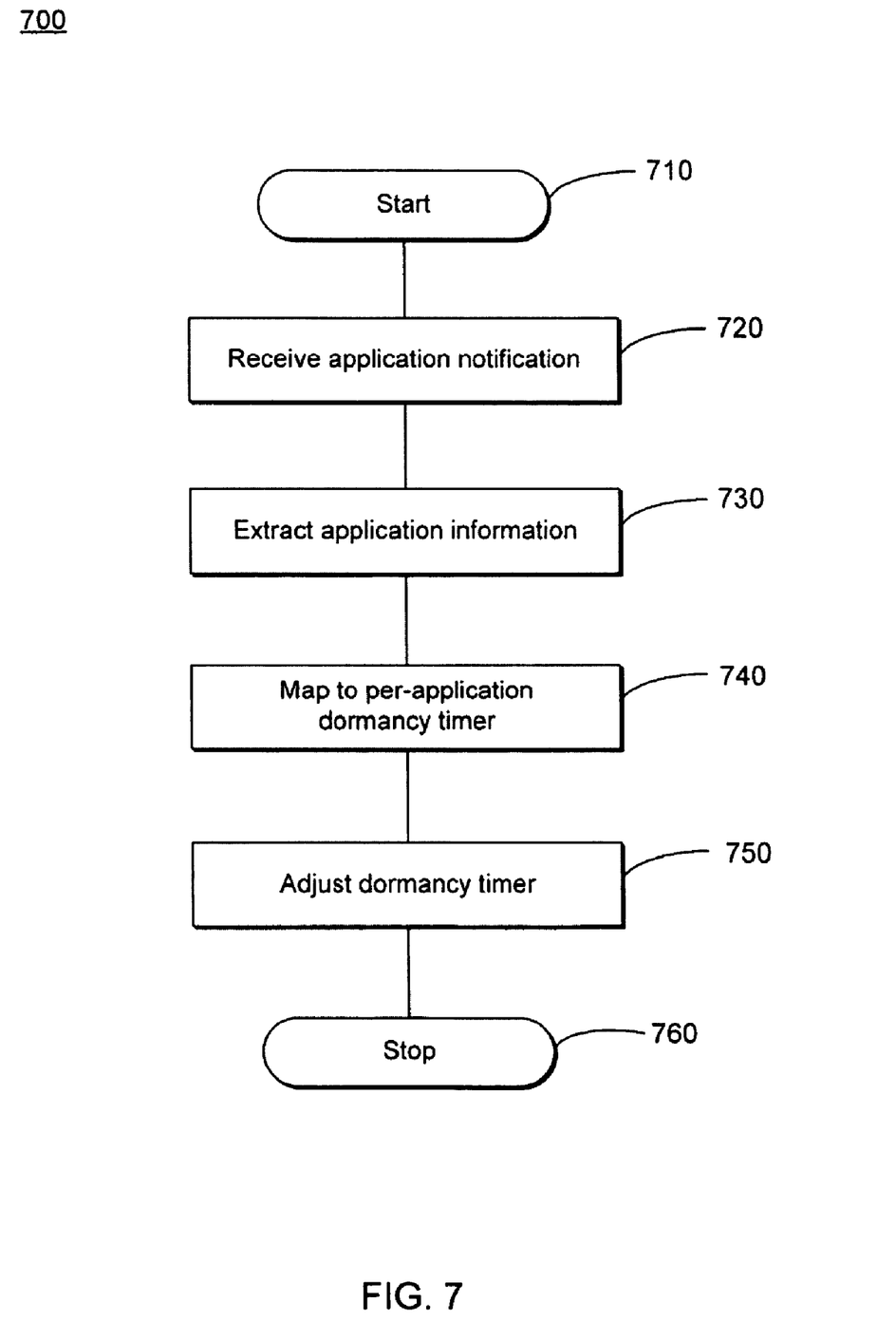
FIG. 7 is a flow chart of an exemplary embodiment of a method for adjusting a dormancy timer in a mobile network.

FIG. 7 is a flow chart of an exemplary embodiment of a method 700 for adjusting a dormancy timer in a mobile network. The processing steps of method 700 may be performed by RNC 140 to adjust a dormancy timer when application information is provided by DPI device 150. It should be apparent, however, that any device that manages the allocation of resources in network 100 may perform method 700.

Exemplary method 700 starts in step 710 and proceeds to step 720, where RNC 140 receives an application notification from DPI device 150. In particular, RNC 140 may receive a packet from DPI device 150 that includes application information. Alternatively, RNC 140 may receive an in-band or out-of-band message from DPI device 150 including application information.

Exemplary method 700 then proceeds to step 730, where dormancy timer controller 210 of RNC 140 extracts application information from the application notification received in step 720. Thus, dormancy timer controller 210 may extract the previously-encoded application information from the packet. More specifically, dormancy timer controller 210 may extract an alphanumeric value from a IP header extension, proprietary protocol extension, or any other portion of the packet. Alternatively, dormancy timer controller 210 may interpret the in-band or out-of-band message received from DPI device 150 to extract the application information.

After determining the application associated with the flow, exemplary method 700 proceeds to step 740, where RNC 140 determines a dormancy timer associated with the application. In particular, dormancy timer controller 210 may query mapping function 220 to determine the dormancy timer value determined to be optimal for the particular application. Thus, in step 740, RNC 140 may determine an optimal dormancy timer based on an accurate determination of the application associated with the flow.

Exemplary method 700 then proceeds to step 750, where RNC 140 adjusts the dormancy timer, if necessary. More specifically, RNC 140 may modify the default dormancy timer value based on the dormancy timer value determined in step 740. For example, if a fixed value was used in setting the default dormancy timer, the application-specific dormancy timer determined in step 740 may be used to set a more efficient dormancy timer value. As another example, the DPI device 150 may determine that the application associated with a flow is different than the application identified using only port numbers contained in the header. Thus, RNC 140 may refine the dormancy timer value based on the more accurate application determination. After adjusting the dormancy timer in step 750, exemplary method 700 proceeds to step 760, where exemplary method 700 stops.

According to the foregoing, various exemplary embodiments, provide a mechanism for more efficient selection of dormancy timers in a radio network. Thus, various exemplary embodiments improve radio bandwidth utilization by ensuring that a user endpoint does not reserve a channel for more time than is required. Conversely, various exemplary embodiments minimize the amount of signaling necessary to establish channels by ensuring that channels are not prematurely closed. In addition, various exemplary embodiments improve user endpoint power management by minimizing the signaling used to maintain a channel. Other advantages and benefits provided for by the embodiments described herein will be apparent to those of skill in the art.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A device for managing selection of dormancy timers in a mobile network, the device comprising:
   a receiver that receives a request for establishment of a new radio channel, the radio channel used for transmission of data packets associated with a flow;
   a channel establishment block that establishes the radio channel and sets a value of a corresponding dormancy timer to a default dormancy timer value for a requested channel type;
   a mapping function that provides a correspondence between applications and optimal dormancy timer values; and
   a dormancy timer controller that:
       identifies an estimated application associated with the flow;
       determines the default dormancy timer value for the requested channel type based on the estimated application;
       receives application information from a Deep Packet Inspection (DPI) device, the application information specifying an application associated with the flow,
       determines a modified dormancy timer value by querying the mapping function using the application information received from the DPI device, and
       changes the value of the dormancy timer to the modified dormancy timer value.

2. The device for managing selection of dormancy timers in a mobile network according to claim 1, wherein the default dormancy timer value is a fixed value specified by a service provider.

3. The device for managing selection of dormancy timers in a mobile network according to claim 1, wherein in identifying an estimated application associated with the flow, the dormancy timer controller:
   identifies the application associated with the flow by examining packet header information in Layers 2 through 4 of a first data packet belonging to the flow, and
   in determining the default dormancy timer value for the requested channel type based on the estimated application, the dormancy timer controller:
   obtains the default dormancy timer value by querying the mapping function using the identified application.

4. The device for managing selection of dormancy timers in a mobile network according to claim 3, wherein the dormancy timer controller identifies the application by querying, using the packet header information, application information provided by the Internet Assigned Numbers Authority for TCP/UDP port number-based applications.

5. The device for managing selection of dormancy timers in a mobile network according to claim 1, wherein the DPI device sends the application information to the dormancy timer controller by inserting information into a data packet associated with the flow.

6. The device for managing selection of dormancy timers in a mobile network according to claim 1, wherein the DPI device sends the application information to the dormancy timer controller using an inband or out-of-band message separate from data packets associated with the flow.

7. The device for managing selection of dormancy timers in a mobile network according to claim 1, wherein the device is a radio network controller (RNC) in a 3G network.

8. The device for managing selection of dormancy timers in a mobile network according to claim 1, wherein the device is a mobile management entity (MME), or a Serving Gateway or PDN Gateway in a Long Term Evolution (LTE) network.

9. A method for efficient selection of dormancy timers in a mobile network, the method comprising:
   receiving a request for establishment of a new radio channel for transmission of packets associated with a flow;
   identifying an estimated application associated with the flow;
   determining a default dormancy timer value to be associated with the radio channel based on the estimated application;
   establishing the radio channel and setting a value of the corresponding dormancy timer to the default dormancy timer value;
   receiving application information from a Deep Packet Inspection (DPI) device, the application information specifying an application associated with the flow;
   determining a modified dormancy timer value based on the application information received from the DPI device; and
   changing the value of the dormancy timer to the modified dormancy time value.

10. The method for efficient selection of dormancy timers in a mobile network according to claim 9, wherein the default dormancy timer value is a fixed value specified by a service provider.

11. The method for efficient selection of dormancy timers in a mobile network according to claim 9, wherein the step of identifying an estimated application associated with the flow comprises:
   identifying the application associated with the flow by examining packet header information in Layers 2 through 4 of a first data packet belonging to the flow, and the step of determining a default dormancy timer value to be associated with the radio channel based on the estimated application comprises:
determining the default dormancy timer value based on the identified application.

12. The method for efficient selection of dormancy timers in a mobile network according to claim 9, wherein the application is identified by querying, using the packet header information, application information provided by the Internet Assigned Numbers Authority for TCP/UDP port number-based applications.

13. The method for efficient selection of dormancy timers in a mobile network according to claim 9, wherein the DPI device sends the application information by inserting information into a data packet associated with the flow.

14. The method for efficient selection of dormancy timers in a mobile network according to claim 9, wherein the DPI device sends the application information using an in-band or out-of-band message separate from data packets associated with the flow.

15. A mobile network configured for efficient selection of dormancy timers, the mobile network comprising:
a user node that receives and transmits data packets;
a deep packet inspection (DPI) device that examines information contained in Layers 2 through 7 of data packets in a flow initiated by the user node, the DPI device determining an application associated with the flow; and
a device that manages allocation of bandwidth in the mobile network, the device comprising:
a receiver that receives a request for establishment of a new radio channel for transmission of data packets associated with the flow,
a channel establishment block that establishes the radio channel and sets a value of a corresponding dormancy timer to a default dormancy timer value,
a dormancy timer controller that identifies an estimated application associated with the flow, determines the default dormancy timer value based on the estimated application, receives application information from the DPI device, determines a modified dormancy timer value using the application information, and changes the value of the dormancy timer to the modified dormancy timer value.

16. The mobile network configured for efficient selection of dormancy timers according to claim 15, wherein the DPI device sends the application information to the dormancy timer controller by inserting information into a data packet associated with the flow.

17. The mobile network configured for efficient selection of dormancy timers according to claim 15, wherein the DPI device sends the application information to the dormancy timer controller using an in-band or out-of-band message separate from data packets associated with the flow.

18. The mobile network configured for efficient selection of dormancy timers according to claim 15, wherein the device that manages allocation of bandwidth further comprises a mapping function that specifies a correspondence between applications and optimal dormancy timers.

19. The mobile network configured for efficient selection of dormancy timers according to claim 15, where the device that manages allocation of bandwidth is a radio network controller in a 3G network.

20. The mobile network configured for efficient selection of dormancy timers according to claim 15, where the device that manages allocation of bandwidth is a mobile management entity (MME) in a Long Term Evolution (LTE) network.

* * * * *